Patented June 25, 1946

2,402,854

UNITED STATES PATENT OFFICE 2,402,854

HYDROCARBON CONVERSION

Charles L. Thomas, Chicago, Ill., assignor to Universal Oil Products Company, Chicago, Ill., a corporation of Delaware No Drawing. Application June 13, 1940, Serial No. 340,361

7 Claims. (Cl. 260—683.3)

This invention is a continuation-in-part of my co-pending application, Serial 286,175, which was filed July 24, 1939. It relates to the catalytic conversion of hydrocarbons having six or more carbon atoms into aromatic hydrocarbons.

In one specific embodiment the present invention comprises a process for producing aromatic hydrocarbons from aliphatic hydrocarbons containing 6-12 carbon atoms by contacting said hydrocarbons with a catalytic material comprising a composite of alumina and chromia promoted by the addition thereto of minor amounts of a compound and particularly an oxide of a metal selected from the group consisting of copper, cerium, thorium and manganese.

Pure hydrocarbons having at least six carbon atoms in a straight chain may be transformed by simultaneous dehydrogenation and cyclization whereby aromatic hydrocarbons are produced. The hydrocarbons converted may consist essentially of a pure hydrocarbon or may comprise relatively narrow boiling fractions of petroleum distillate, for example, such as a hexane, heptane, octane, etc., fraction of straight run or cracked naphtha.

The catalysts of the present invention are normally prepared by impregnation, mixing, coprecipitation, and otherwise combining the various constituents under conditions whereby active catalytic composites are obtained. The alumina constituent may be obtained, for example, from various natural ores which are treated to convert them to the oxide form, usually by heating with or without added steam.

A further method of preparing the Activated Alumina is by the precipitation of aluminum hydroxide from a salt of aluminum, such as aluminum nitrate or aluminum chloride, by the addition thereto of ammonium hydroxide or other alkaline precipitants. The chromia constituent may be added by mixing granular or powdered Activated Alumina with an aqueous solution of chromic acid followed by drying.

Another method comprises mixing Activated Alumina with chromium trioxide and heating at a temperature of approximately 300° C., whereby the chromium trioxide ($CrO_3$) is converted to the sesquioxide ($Cr_2O_3$) with the evolution of oxygen.

Another method which has been found useful comprises the coprecipitation of aluminum hydroxide and chromium hydroxide from aqueous solutions of salts such as the nitrates by the addition of ammonium hydroxide, and drying the precipitate. The third component may also be precipitated at the same time.

In other alternative, Activated Alumina is mixed with a solution of a chromium salt and the hydroxide precipitated by the addition of ammonium hydroxide.

The third component may be added in a number of ways. One convenient method consists in dissolving the oxide or carbonate of the third component in a solution of chromic acid. The Activated Alumina is then impregnated with mixed hydroxides precipitated from the solution by ammonium hydroxide, dried and calcined.

According to another method, the third component may be added in combination with one of the other constituents such as, for example, in the form of a soluble chromate such as the dichromate, or it may be added as a salt which is then precipitated on the alumina simultaneously with the chromia. The quantity of chromia in the final mixture may vary considerably depending in part upon the method by which the catalyst is prepared. It is normally of the order of 4-30%, and preferably of the order of 10-20% by weight. The quantity of promoting oxide added to the alumina-chromia catalyst likewise may be varied over a considerable range, but is usually within the range of 0.1-20% by weight, normally 0.1-10%.

The catalysts of the invention may be used as powders but are usually used in the form of particles such as granules, pellets, etc. Granules of Activated Alumina may be impregnated, dried, calcined and used without forming or pelleting. When Activated Alumina powder is used as the starting material, it is impregnated, dried, and the powder is mixed with a suitable lubricant such as aluminum stearate, stearic acid, stearic acid and flour, metal powders, etc., and formed by compression methods into shapes such as pellets or spheres which are used as packing material in towers or tubes. Following this step the catalyst is calcined at a temperature in excess of 500° C.

The catalyst granules, pellets, spheres or other suitable shapes are used as packing materials for reactor tubes, reaction chambers, or similar apparatus through which hydrocarbon gases or vapors are passed under proper conditions for conversion.

The temperature used for carrying out the process is normally within the range of approximately 450-700° C. or higher and the pressure is atmospheric or slightly superatmospheric, say of the order of 50-100 pounds per square inch. The contact time may range from 0.5-60 seconds, normally being 0.5-6 seconds.

During the course of the reaction there is a gradual deposition and accumulation of non-volatile carbonaceous material on the catalytic surfaces, whereby they are eventually rendered less active. The catalysts can then be reactivated by heating them in the presence of an oxygen-containing gas at temperatures in excess of 500° C., whereby the carbonaceous deposits are removed to a greater or less degree by combustion.

Although the compounds and particularly the oxides of the elements used in the present invention for increasing the catalytic effect of alumina-chromia catalysts are all definitely effective, it is not intended to infer that the different compounds of any one element or the corresponding compounds of different elements are exactly equivalent in their promoting effect.

The following examples are given to illustrate the usefulness of the present type of catalysts but should not be construed as limiting it to the exact conditions given therein, either as to the reaction in which they are employed is concerned, to their components or the exact method of their preparation.

A catalyst made up of 100 parts of granular Activated Alumina and 12 parts by weight of chromic oxide ($Cr_2O_3$) was prepared by impregnating the alumina with a solution of chromic acid followed by drying. One portion of the material was calcined at a temperature of 500° C. and used as a catalyst to cyclicize the heptane fraction of a straight run Michigan gasoline. The temperature used was approximately 600° C. and the pressure atmospheric. A total recycling yield of approximately 76% of toluene was produced in this process.

The remaining portion of the catalyst described was divided up and impregnated with the promoters described in the following examples. When the cyclization reaction is carried out under the conditions indicated for the catalyst without promoter, yields as indicated under the various examples may be obtained.

Example 1

A catalyst comprising alumina-chromia promoted with 1% of copper oxide yields 78% of toluene.

Example 2

A chrome-alumina catalyst impregnated with 3% of cerium oxide yields approximately 77.5% of toluene.

Example 3

A catalyst containing approximately 5% of thorium oxide yields approximately 78.5% of toluene.

Example 4

A catalyst containing approximately 0.5% of manganese oxide yields approximately 79% of toluene.

I claim as my invention:

1. A process for converting aliphatic hydrocarbons having from 6–12 carbon atoms into aromatics which comprises contacting said aliphatic hydrocarbons with a catalytic agent consisting of alumina and chromia promoted by a minor amount of a compound of a metal selected from the group consisting of manganese, copper, cerium and thorium at a temperature within the range of approximately 450–700° C. and a pressure of substantially atmospheric to 100 pounds per square inch, and recovering the aromatic hydrocarbons.

2. A process for producing aromatic hydrocarbons from aliphatic hydrocarbons containing 6–12 carbon atoms per molecule which comprises contacting said aliphatic hydrocarbons with a catalyst consisting of alumina and chromia promoted by a minor amount of an oxide of a metal selected from the group consisting of manganese, copper, cerium and thorium at a temperature within the range of approximately 450–700° C. and a pressure of substantially atmospheric to 100 pounds per square inch and recovering said aromatic hydrocarbons.

3. A process for producing aromatic hydrocarbons from aliphatic hydrocarbons containing 6–12 carbon atoms per molecule which comprises contacting said aliphatic hydrocarbons with a catalytic agent comprising a major portion of alumina supporting approximately 4–12% by weight of an oxide of chromium and approximately 0.1–10% by weight of an oxide of a metal selected from a group consisting of manganese, copper, cerium and thorium at a temperature within the range of approximately 450–700° C. and a pressure not in excess of approximately 50–100 pounds per square inch, and recovering the aromatic hydrocarbons formed.

4. The method of dehydrogenating hydrocarbons which comprises contacting said hydrocarbons under dehydrogenating conditions with a catalyst comprising a major proportion of alumina and minor proportions of chromia and a compound of a metal selected from the group consisting of manganese, copper, cerium and thorium.

5. The method of dehydrogenating hydrocarbons which comprises contacting said hydrocarbons under dehydrogenating conditions with a catalyst comprising a major proportion of alumina and minor proportions of chromia and an oxide of a metal selected from the group consisting of manganese, copper, cerium and thorium.

6. A process for converting aliphatic hydrocarbons having from six to twelve carbon atoms into aromatics which comprises contacting said aliphatic hydrocarbons at a temperature in the approximate range of 450°–700° C. with a catalyst comprising a major proportion of alumina and minor proportions of chromium oxide and manganese oxide.

7. A process for improving gasoline fractions containing aliphatic hydrocarbons which comprises contacting said fractions at a temperature in the approximate range of 450°–700° C. with a catalyst comprising a major proportion of alumina and minor proportions of chromium oxide and manganese oxide.

CHARLES L. THOMAS.